United States Patent
Yamaguchi

(10) Patent No.: US 12,235,468 B2
(45) Date of Patent: Feb. 25, 2025

(54) VIRTUAL IMAGE DISPLAY DEVICE AND POLARIZATION ADJUSTMENT MEMBER

(71) Applicant: DENSO CORPORATION, Kariya (JP)

(72) Inventor: Masayuki Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 491 days.

(21) Appl. No.: 17/734,850

(22) Filed: May 2, 2022

(65) Prior Publication Data

US 2022/0260844 A1 Aug. 18, 2022

Related U.S. Application Data

(63) Continuation of application No. PCT/JP2020/038868, filed on Oct. 15, 2020.

(30) Foreign Application Priority Data

Nov. 11, 2019 (JP) .................. 2019-204067

(51) Int. Cl.
*G02B 27/28* (2006.01)
*G02B 27/01* (2006.01)

(52) U.S. Cl.
CPC ....... *G02B 27/281* (2013.01); *G02B 27/0101* (2013.01); *G02B 27/0149* (2013.01); *G02B 2027/0196* (2013.01)

(58) Field of Classification Search
CPC .... G02B 27/01–0189; G02B 2027/0105–0198
See application file for complete search history.

(56) References Cited

U.S. PATENT DOCUMENTS

| | | | |
|---|---|---|---|
| 2017/0045738 A1* | 2/2017 | Kim | G02B 27/0101 |
| 2017/0059863 A1 | 3/2017 | Kasazumi et al. | |
| 2018/0081172 A1 | 3/2018 | Liu et al. | |
| 2019/0041641 A1* | 2/2019 | Christmas | G02B 5/26 |
| 2019/0179143 A1 | 6/2019 | Nambara | |

FOREIGN PATENT DOCUMENTS

| | | |
|---|---|---|
| JP | H0980355 A | 3/1997 |
| JP | 4114194 B2 | 7/2008 |
| JP | 2010210984 A | 9/2010 |
| JP | 201122210 A | 2/2011 |

(Continued)

*Primary Examiner* — Bao-Luan Q Le
*Assistant Examiner* — Christopher A Lamb, II
(74) *Attorney, Agent, or Firm* — Harness, Dickey & Pierce, P.L.C.

(57) ABSTRACT

A virtual image display device includes a polarization adjustment member that includes a polarizing plate and a support plate. The polarizing plate has a property of blocking a light which is oscillated in an axial direction of a block axis while the polarizing plate is in a state where a residual stress, a degree of which is maximized in a first residual stress direction along a plane of the polarizing plate, is left in the polarizing plate. The support plate supports the polarizing plate while the support plate is in a state where a residual stress, a degree of which is maximized in a second residual stress direction along a plane of the support plate, is left in the support plate. The polarizing plate and the support plate are bonded together such that the first residual stress direction is along the second residual stress direction.

6 Claims, 6 Drawing Sheets

(56) References Cited

FOREIGN PATENT DOCUMENTS

| JP | 2014134629 A | 7/2014 |
|----|--------------|--------|
| JP | 2016197173 A | 11/2016 |
| JP | 6238072 B2 | 11/2017 |
| JP | 2017207622 A | 11/2017 |
| JP | 201872488 A | 5/2018 |

\* cited by examiner

VIRTUAL IMAGE DISPLAY DEVICE AND POLARIZATION ADJUSTMENT MEMBER

CROSS REFERENCE TO RELATED APPLICATIONS

This application is a continuation application of International Patent Application No. PCT/JP2020/038868 filed on Oct. 15, 2020, which designated the U.S. and claims the benefit of priority from Japanese Patent Application No. 2019-204067 filed on Nov. 11, 2019. The entire disclosures of all of the above applications are incorporated herein by reference.

TECHNICAL FIELD

The present disclosure relates to a technique for displaying a virtual image.

BACKGROUND

There has been proposed a virtual image display device that is configured to display a virtual image which is formed by a display light through reflection of the display light at a translucent member and is visually recognizable. This device includes a polarization adjustment member that adjusts polarization of at least one of the display light and an external light which travel along an optical path of an imaging optical system used for displaying the virtual image. In the polarization adjustment member, a polarizing film, which serves as a polarizing plate, is held by a translucent substrate which serves as a support plate.

SUMMARY

This section provides a general summary of the disclosure, and is not a comprehensive disclosure of its full scope or all of its features.

According to the present disclosure, there is provided a virtual image display device configured to display a virtual image that is formed by a display light through reflection of the display light at a translucent member and is visually recognizable. The virtual image display device includes a projector and a polarization adjustment member. The projector is configured to project the display light. The polarization adjustment member is located along an optical path, which extends from the projector to the translucent member, while the polarization adjustment member is configured to adjust polarization of at least one of the display light and an external light which travel along the optical path. The polarization adjustment member includes a polarizing plate and a support plate. The polarizing plate and the support plate are bonded together such that a first residual stress direction of the polarizing plate is along a second residual stress direction of the support plate.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
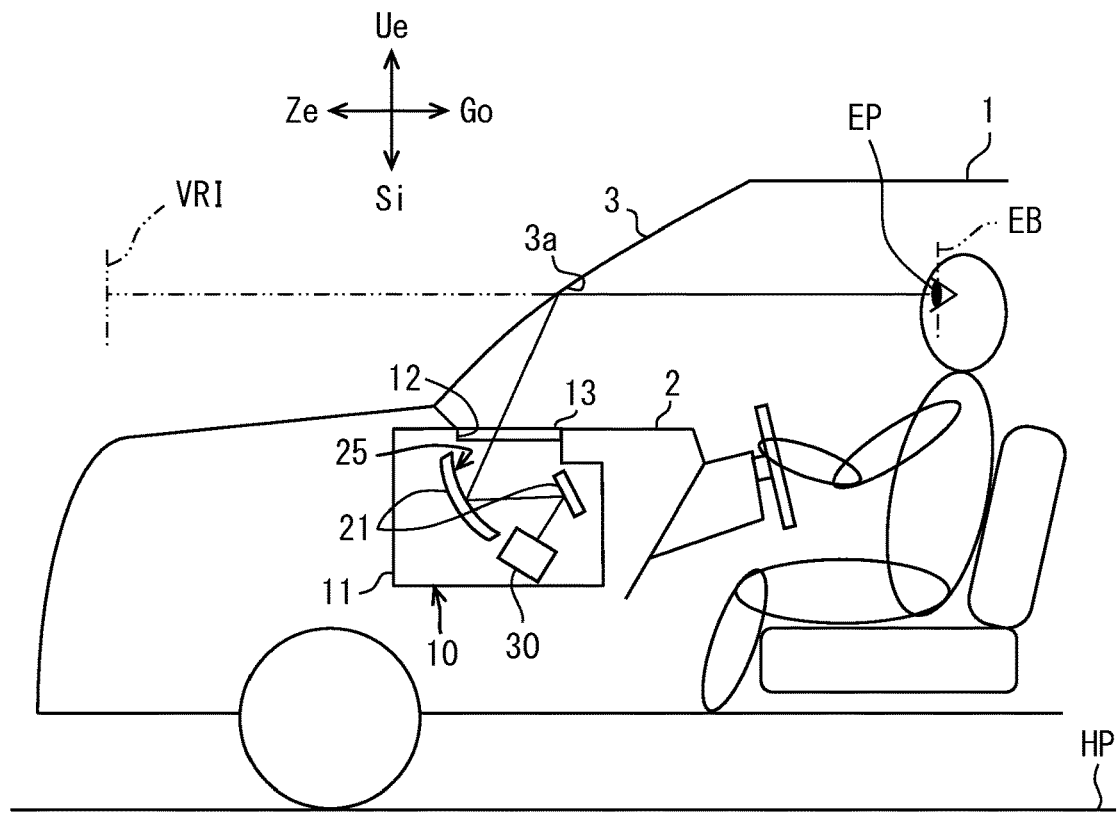
FIG. 1 is a diagram showing a state in which an HUD of a first embodiment is installed at a vehicle.

There has been proposed a virtual image display device that is configured to display a virtual image which is formed by a display light through reflection of the display light at a translucent member and is visually recognizable. This device includes a polarization adjustment member that adjusts polarization of at least one of the display light and an external light which travel along an optical path of an imaging optical system used for displaying the virtual image. In the polarization adjustment member, a polarizing film, which serves as a polarizing plate, is held by a translucent substrate which serves as a support plate.

The polarizing plate is often manufactured through a manufacturing process including a stretching treatment or the like to add a polarization property to the polarizing plate. Therefore, the polarizing plate is installed in the optical path of the imaging optical system used for displaying the virtual image while the polarizing plate is in the form of the polarization adjustment member bonded to the support plate in a state where a residual stress is left in the polarizing plate.

An external light, such as a sunlight transmitted through the translucent member may enter the polarization adjustment member when the external light travels along the optical path. When the polarization adjustment member gets hot due to the incident of the external light, the polarization adjustment member may possibly be deformed unintentionally due to the effect of relieving the residual stress from the polarization adjustment member in response to the temperature change. When deformation, such as warp, occurs in the polarization adjustment member, there is a concern that an expected optical action, which is supposed to occur in the non-deformed state of the polarization adjustment member, cannot be exhibited.

According to one aspect of the present disclosure, there is provided a virtual image display device configured to display a virtual image that is formed by a display light through reflection of the display light at a translucent member and is visually recognizable, the virtual image display device comprising:

a projector that is configured to project the display light; and a polarization adjustment member that is located along an optical path, which extends from the projector to the translucent member, while the polarization adjustment member is configured to adjust polarization of at least one of the display light and an external light which travel along the optical path, wherein:

the polarization adjustment member includes:

a polarizing plate that is shaped in a thin plate form and has a property of blocking a light which is oscillated in an axial direction of a block axis of the polarizing plate, wherein the polarizing plate is in a state where a residual stress, a degree of which is maximized in a first residual stress direction along a plane of the polarizing plate, is left in the polarizing plate; and a support plate that is shaped in a plate form and supports the polarizing plate, wherein the support plate is in a state where a residual stress, a degree of which is maximized in a second residual stress direction along a plane of the support plate, is left in the support plate; and the polarizing plate and the support plate are bonded together such that the first residual stress direction is along the second residual stress direction.

Furthermore, according to another aspect of the present disclosure, there is provided a polarization adjustment member configured to be placed along an optical path of an imaging optical system used for displaying a virtual image, the polarization adjustment member comprising:

a polarizing plate that is shaped in a thin plate form and has a property of blocking a light which is oscillated in an axial direction of a block axis of the polarizing plate, wherein the polarizing plate is in a state where a residual stress, a degree of which is maximized in a first residual stress direction along a plane of the polarizing plate, is left in the polarizing plate; and a support plate that is shaped in a plate form and supports the polarizing plate, wherein the support plate is in a state where a residual stress, a degree of which is maximized in a second residual stress direction along a plane of the support plate, is left in the support plate wherein:

the polarizing plate and the support plate are bonded together such that the first residual stress direction is along the second residual stress direction.

According to these aspects, at the polarizing plate and the support plate, which are bonded together, the first residual stress direction of the polarizing plate is along the second residual stress direction of the support plate. That is, the direction, in which the degree of the residual stress left in the polarizing plate is maximized, and the direction, in which the degree of the residual stress left in the support plate is maximized, coincide with each other. Thus, even if the residual stress of the polarizing plate and the residual stress of the support plate are relieved in response to the temperature change of the polarization adjustment member due to the incident of the external light on the polarization adjustment member, it is possible to limit an occurrence of deformation of the polarizing plate and deformation of the support plate in different directions, respectively. In other words, the occurrence of the deformation, such as unintentional warpage, is limited.

For example, since the complicated deformation of the polarization adjustment member is limited, an occurrence of local unevenness of the optical action of the polarization adjustment member and also an occurrence of local unevenness (for example, luminance unevenness) in the display quality of the virtual image can be limited. Furthermore, for example, the undeformed state of the polarization adjustment member can be easily maintained if the minimum deformation countermeasure corresponding to the directions, which coincide with each other, is taken. As described above, it is possible to stably exert the optical action in the display of the virtual image.

Hereinafter, embodiments of the present disclosure will be described with reference to the drawings. By assigning the same reference signs to the corresponding components in each embodiment, redundant description thereof may be omitted. When only a part of a structure is described in the following respective embodiments, the description of the preceding embodiment(s) may be applied to the rest of the structure. Further, besides a combination(s) of components specified in the description of each embodiment, components of the embodiments may be partially combined even if such a combination is not specified as long as there is no problem with respect to such a combination.

First Embodiment

As shown in FIG. 1, a virtual image display device according to a first embodiment of the present disclosure is configured to be mounted on an automobile 1 (serving as a vehicle) and is formed as a head-up display (hereinafter HUD) 10 received in an instrument panel 2 of the automobile 1. Here, the vehicle is broadly understood to include any one of various vehicles, such as automobiles, railroad vehicles, aircrafts, ships, and non-moving housings for a game.

The HUD 10 provides a display light of an image that is projected toward a windshield 3 of the automobile 1. As a result, the HUD 10 displays the image as a virtual image VRI that is visually recognizable by an occupant (e.g., a driver) serving as a viewer. That is, when the display light, which is reflected by the windshield 3, reaches a viewable range EB set in a vehicle cabin, the occupant whose eye point EP is located in the viewable range EB perceives the light of the image. The occupant can recognize various information through a display content that is superimposed on the scenery outside the vehicle.

Examples of the display contents may include contents for displaying the state of the automobile 1 such as a vehicle speed and the remaining fuel amount, contents for displaying navigation information, such as visibility assist information and road information, and the like.

In the following, unless otherwise specified, the directions indicated by front (a front side Ze in FIG. 1), rear (a rear side Go in FIG. 1), up (an upper side Ue in FIG. 1), down (a lower side Si in FIG. 1), left and right are indicated with reference to the automobile 1 placed on the horizontal plane HP.

The windshield 3 is a translucent member that is shaped in a plate form having translucency and is made of, for example, glass or synthetic resin. The windshield 3 is located on the upper side Ue of the instrument panel 2. The windshield 3 is tilted such that the windshield 3 is further spaced away from the instrument panel 2 toward the upper side Ue as a location along the windshield 3 shifts from the front side Ze toward the rear side Go. The windshield 3 has a reflecting surface 3a that reflects the display light and is shaped in a smooth concave or planar form. The reflecting surface 3a of the present embodiment is configured to reflect the display light by surface reflection.

It should be noted that the windshield 3 may have a reflective holographic optical element to reflect the display light toward the viewable range EB by diffraction reflection induced by interference fringes instead of the surface reflection. Furthermore, instead of the windshield 3, for example, a combiner, which is formed separately from the automobile 1, may be installed in the vehicle cabin such that the combiner reflects the display light toward the viewable range EB.

The viewable range EB is a spatial range in which the virtual image VRI displayed by the HUD 10 can be visually recognized so as to satisfy a predetermined standard (for example, to implement the entire virtual image VRI having a predetermined brightness or higher) and is also referred to as an eyebox. The viewable range EB is typically set so as to overlap with the eyelips set in the automobile 1. The eyelips is set for each of the eyes and is set as an ellipsoidal virtual range based on an eye range that statistically represents a spatial distribution of the occupant's eye point EP.

A specific structure of such an HUD 10 will be described below. The HUD 10 includes a housing 11, a light guide unit 21 and a projector unit 30.

The housing 11 is made of, for example, a synthetic resin or metal and is shaped in a hollow form to receive the light guide unit 21 and the projector unit 30. The housing 11 is placed at an inside of the instrument panel 2. The housing 11 has a window portion 12 that optically opens at an upper surface portion of the housing 11 which is opposed to the windshield 3 in a top-to-bottom direction. The window portion 12 may be physically opened or may be covered with a dustproof sheet 13 which can transmit the display light therethrough.

The light guide unit 21 is an optical system that guides the display light, which is outputted from the projector unit 30, toward the windshield 3. The light guide unit 21 may have any one of various configurations, such as a configuration, which includes a single concave mirror, a configuration, which includes a combination of a single plane mirror and a single concave mirror, or a configuration of a single convex mirror and a single concave mirror. Here, it is preferable that the light guide unit 21 has a function of magnifying the virtual image VRI visually recognized by the occupant with respect to the image formed by the projector unit 30.

Figure 2:
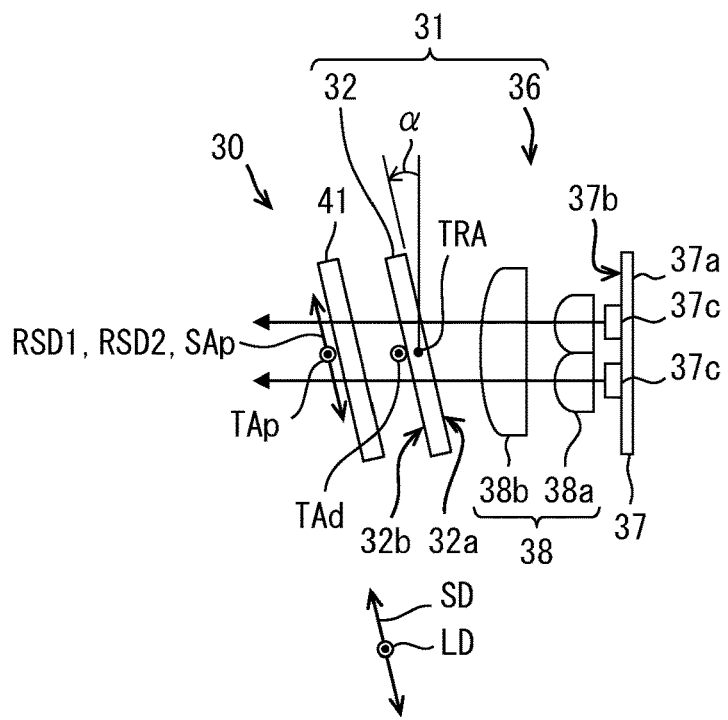
FIG. 2 is a cross-sectional view showing an optical configuration of a projector unit of the first embodiment.
Figure 3:
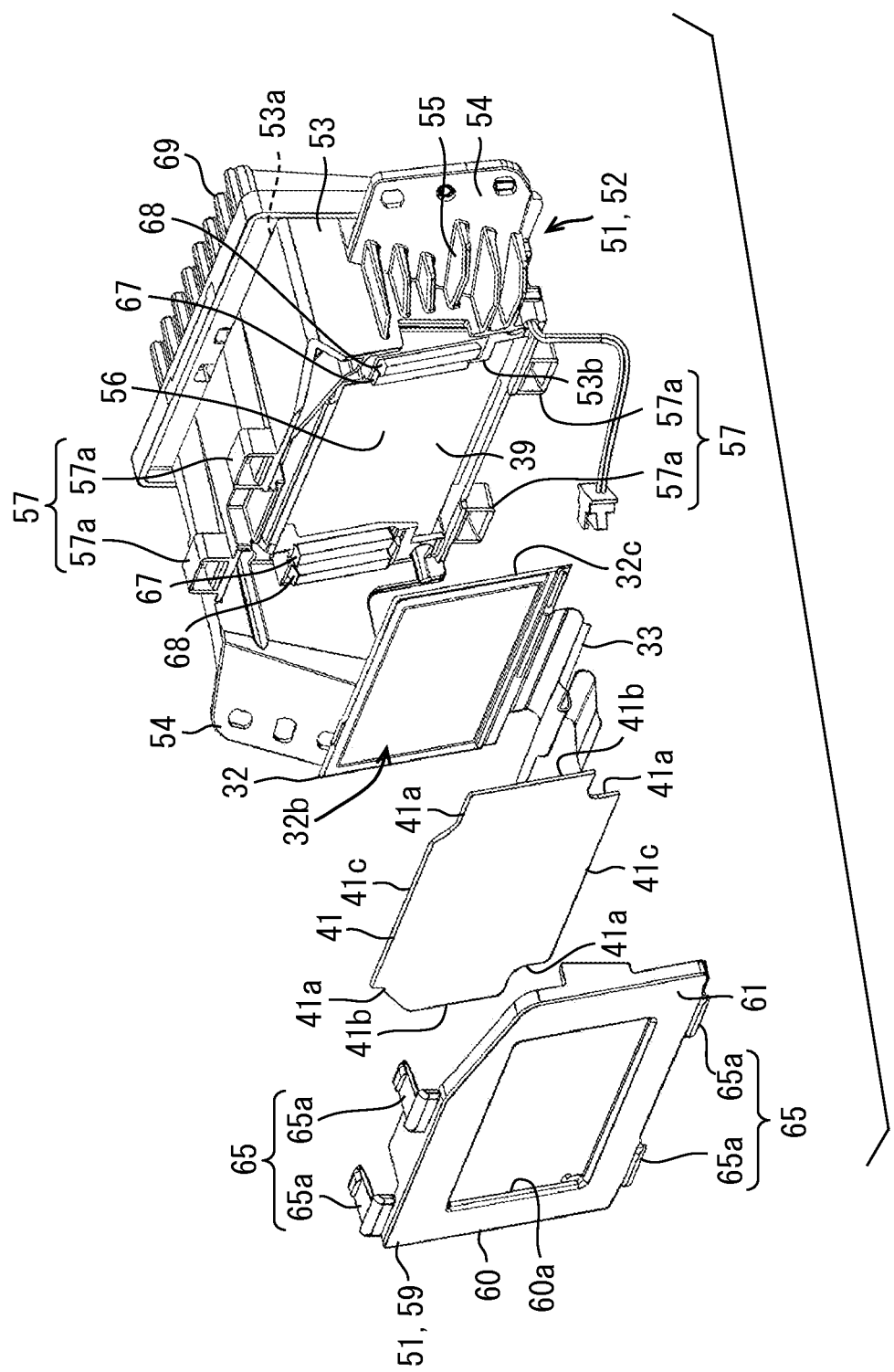
FIG. 3 is an exploded perspective view of the projector unit of the first embodiment.

As shown in FIGS. 2 and 3, the projector unit 30 is a unit in which a projector 31 and a polarization adjustment member 41 are integrated by using a common case 51. The projector 31 projects the display light of the image that can be imaged as the virtual image VRI in the air. The projector 31 of the present embodiment is a liquid crystal projector that includes a liquid crystal panel 32, which serves as an image display panel, and a backlight 36.

The liquid crystal panel 32 is a transmissive TFT liquid crystal panel of an active-matrix type that uses a thin film transistor (TFT) and forms a plurality of pixels arranged in, for example, a two-dimensional array. The liquid crystal panel 32 is shaped in a plate form that has a rectangular contour with a longitudinal direction LD and a transverse direction SD. A flexible cable 33 for electrically connecting the liquid crystal panel 32 to a drive circuit is connected to a long side of the liquid crystal panel 32. An illumination subject surface 32a of the liquid crystal panel 32 is illuminated by the backlight 36. The drive circuit controls a transmittance of an illuminating light of each of the pixels of the liquid crystal panel 32 such that the liquid crystal panel 32 displays a real image on a display screen 32b that is on a side opposite to the illumination subject surface 32a. The liquid crystal panel 32 forms a rectangular frame 32c, which surrounds an entire perimeter of the display screen 32b and the illumination subject surface 32a, so that a size of the liquid crystal panel 32 is one size larger than the display screen 32b and the illumination subject surface 32a.

The liquid crystal panel 32 has a pair of polarizing plates and a liquid crystal layer which are stacked such that the liquid crystal layer is held between the polarizing plates. Each of the polarizing plates has a transmission axis and a block axis which are perpendicular to each other to implement a property of transmitting a light oscillated in the axial direction of the transmission axis and absorbing a light oscillated in an axial direction of the block axis. The pair of polarizing plates are arranged such that the transmission axes of the pair of polarizing plates are perpendicular to each other. By applying a voltage for each of the liquid crystal pixels, the liquid crystal layer can rotate the polarization direction of the light which is transmitted through the liquid crystal layer according to the applied voltage. In this way, the liquid crystal panel 32 can change a ratio of the light transmitted through the polarizing plate placed on the display screen side, i.e., the transmittance, for each of the liquid crystal pixels by rotating the polarization direction. Color filters of different colors (e.g., red, green and blue) are provided to corresponding adjacent ones of the liquid crystal pixels, and various colors can be reproduced by combining these.

By setting the transmission axis TAd of the polarizing plate placed on the display screen 32b side such that the transmission axis TAd extends along the longitudinal direction LD or the transverse direction SD of the liquid crystal panel 32, the polarization direction of the display light outputted from the liquid crystal panel 32 is set to be along the longitudinal direction LD or the transverse direction SD of the liquid crystal panel 32. Particularly, in the present embodiment, the polarization direction of the display light is set to be along the longitudinal direction LD of the liquid crystal panel 32.

The backlight 36 shown in FIG. 2 is configured to illuminate an entire area of the illumination subject surface 32a of the liquid crystal panel 32. The backlight 36 includes a light source unit 37 and a light collecting unit 38. The light source unit 37 includes a plurality of light source elements 37c which are arranged on a surface (hereinafter referred to as a light source arrangement surface 37b) of a light source circuit board 37a. The light source circuit board 37a is a rigid circuit board that is shaped in a flat plate form and is formed by using a synthetic resin, such as glass epoxy resin, as a base material. The light source circuit board 37a is arranged in such a posture that the light source arrangement surface 37b is tilted with respect to the display screen 32b and the illumination subject surface 32a of the liquid crystal panel 32 at a tilt angle α of, for example, about 10 to 15 degrees. A wiring pattern is formed on the light source arrangement surface 37b, so that each of the light source elements 37c is connected to a power supply through the wiring pattern.

The plurality of light source elements 37c are arranged in a one-dimensional array or a two-dimensional array on the planar light source arrangement surface 37b. For example, a light emitting diode element, which serves as a point light source, is used in each of the light source elements 37c. The light source element 37c is formed by sealing a chip-shaped blue light emitting diode with a yellow phosphor in which a yellow fluorescent agent is mixed with a translucent synthetic resin. The yellow phosphor is excited by a blue light emitted from the blue light emitting diode according to the amount of electric current applied thereto, and thereby a yellow light is emitted. As a result of mixing of the blue light and the yellow light, a white (more specifically, pseudo-white) illumination light is emitted from the light source element 37c toward the image display panel. Here, an intensity peak direction, in which a degree of an emission intensity of the illuminating light is maximized, at each light source element 37c is a direction that is substantially perpendicular to the light source arrangement surface 37b, i.e., a direction along a normal direction which is normal to the light source arrangement surface 37b.

The light collecting unit 38 collects the illumination light, which is emitted from each of the light source elements 37c, without substantially changing the intensity peak direction to enhance the directivity of the illumination light, and then the light collecting unit 38 irradiates the collected illuminating light on the illumination subject surface 32a of the liquid crystal panel 32. The light collecting unit 38 includes a convex lens array 38a and a convex lens 38b. The convex lens array 38a is formed by a plurality of convex lens elements which are arranged according to the arrangement of the light source elements 37c. The convex lens 38b has a single optical surface.

In this way, the backlight 36 does not apply the illumination light from the direction perpendicular to the illumination subject surface 32a of the liquid crystal panel 32 but applies the illumination light from an oblique direction that is set based on the above-mentioned tilt angle α. When the liquid crystal panel 32 linearly transmits the illumination light, the display light, which is outputted from the display screen 32b, is also outputted in an oblique direction with respect to the display screen 32b based on the above-mentioned tilt angle α.

According to the present embodiment, in a cross section (i.e., a cross section shown in FIG. 2) of the rectangular liquid crystal panel 32, which is taken along the transverse direction SD, the liquid crystal panel 32 is tilted relative to the light source arrangement surface 37b at the tilt angle α described above. On the other hand, in the cross section of the liquid crystal panel 32, which is taken in the longitudinal direction LD, the tilt of the liquid crystal panel 32 is more limited than on the cross section which is taken in the transverse direction SD. For example, the liquid crystal panel 32 is arranged such that the liquid crystal panel 32 is substantially parallel to the light source arrangement surface 37b. That is, the liquid crystal panel 32 is tilted from a parallel posture of the liquid crystal panel 32, which is parallel to the light source arrangement surface 37b, to the tilted posture by rotating the liquid crystal panel 32 about a tilt reference axis TRA, which is parallel to the longitudinal direction LD, by the above-mentioned tilt angle α.

The display light and an external light may travel forward or backward along an optical path, which extends from the projector 31 to the windshield 3. As described above, the display light, which is projected from the projector 31, travels to the windshield 3 through the light guide unit 21 and the window portion 12. On the other hand, the external light, which is, for example, the sunlight applied downward from the upper side Ue to the windshield 3 located on the lower side Si, passes through the windshield 3 and travels backward along the optical path. When the external light, which travels backward along the optical path, reaches the display screen 32b of the liquid crystal panel 32, a part of its energy may be converted into heat. When the liquid crystal panel 32 receives the considerable amount of heat damage in this way, it becomes difficult to maintain the display quality of the image displayed on the display screen 32b.

The external light, which is reflected on the display screen 32b, is separated from the optical path due to the tilted posture of the liquid crystal panel 32 described above. The external light, which is reflected on the display screen 32b, can be relatively easily separated from the optical path because the external light is shifted in the transverse direction SD, in which a light bundle width is smaller with respect to the display light.

The polarization adjustment member 41 is arranged particularly between the projector 31 and the light guide unit 21 along the optical path, which extends from the projector 31 to the windshield 3, such that the polarization adjustment member 41 forms an imaging optical system of the HUD 10. The polarization adjustment member 41 is shaped in a flat plate form and is arranged substantially parallel to the liquid crystal panel 32. That is, the polarization adjustment member 41 is rotated from a parallel posture, which is parallel to the light source arrangement surface 37b, to a tilted posture about a tilt reference axis of the polarization adjustment member 41, which is parallel to the tilt reference axis TRA of the liquid crystal panel 32, by the same tilt angle α as the liquid crystal panel 32.

The polarization adjustment member 41 is formed to be one size larger than the liquid crystal panel 32. However, an outer peripheral contour of the polarization adjustment member 41 forms four recesses 41a and four bulges 41b, 41c. The four recesses 41a are formed by inwardly recessing four corner portions of the outer peripheral contour of the polarization adjustment member 41 relative to an outer peripheral contour of the liquid crystal panel 32. The bulges 41b, 41c are formed by outwardly bulging two long sides and two short sides of the outer peripheral contour of the polarization adjustment member 41 relative to the four recesses 41a. Among the four bulges 41b, 41c, a pair of bulges 41b, between which a center of the polarization adjustment member 41 is interposed in the longitudinal direction LD, are outwardly bulged relative to the outer peripheral contour of the liquid crystal panel 32. On the other hand, among the four bulges 41b, 41c, each of a pair of bulges 41c, between which the center of the polarization adjustment member 41 is interposed in the transverse direction SD, is bulged to a position that is the same as the position of the outer peripheral contour of the liquid crystal panel 32.

A shape of the outer peripheral contour of the polarization adjustment member 41 is asymmetric about an imaginary reference line VRL1 (see FIG. 7) that bisects a surface area of the polarization adjustment member 41 in the longitudinal direction LD of the liquid crystal panel 32. Similarly, the shape of the outer peripheral contour of the polarization adjustment member 41 is asymmetric about an imaginary reference line VRL2 (see FIG. 7) that bisects the surface area of the polarization adjustment member 41 in the transverse direction SD of the liquid crystal panel 32.

Figure 4:
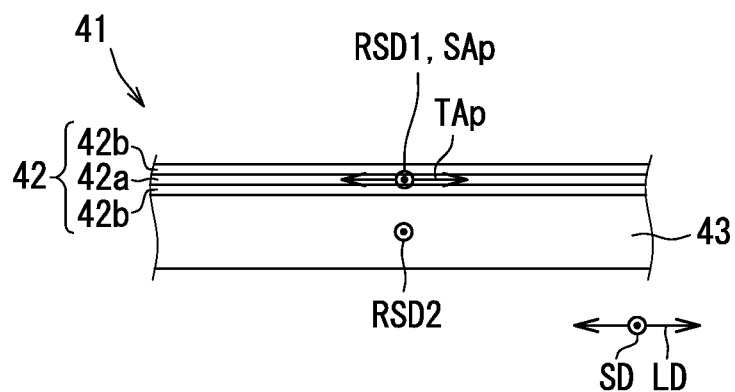
FIG. 4 is a partially enlarged cross-sectional view of a polarization adjustment member of the first embodiment.

As shown in FIG. 4, the polarization adjustment member 41 is formed in a state where a polarizing plate 42 and a support plate 43 are bonded together. The polarizing plate 42 has a property of transmitting the light, which is oscillated in a transmission direction along the transmission axis TAp (i.e., an axial direction of the transmission axis TAp), and blocking the light oscillated in a block direction along the block axis SAp (i.e., an axial direction of the block axis SAp). That is, the polarizing plate 42 has a so-called polarization property.

The polarization adjustment member 41 is configured to adjust the polarization of at least one of the display light and the external light which travel along the optical path. In this embodiment, the polarization of the external light is mainly adjusted. Specifically, the polarization adjustment member 41 has a function of inputting only the polarized light, which is oscillated in the transmission direction, onto the liquid crystal panel 32 among the external light by blocking the light oscillated in the block direction among the external light. That is, the polarization adjustment member 41 reduces the amount of the external light, which is reached to the liquid crystal panel 32 and is absorbed by the liquid crystal panel 32, to limit a heat damage to the liquid crystal panel 32. In the present embodiment, the polarization of the display light outputted from the liquid crystal panel 32 is not substantially changed by the polarization adjustment member 41, but the polarization adjustment member 41 exhibits the polarization adjusting function in the sense of maintaining the polarization of the liquid crystal panel 32.

The polarizing plate 42 of the present embodiment is an absorption type polarizing plate that is shaped in a thin plate form (film form) and has a multi-layered structure, in which a polarizing layer 42a is clamped between a pair of protective layers 42b. The respective layers are bonded by a bonding agent that is mainly composed of PVA (polyvinyl alcohol) resin.

The polarizing layer 42a is formed by adding iodine, which is a dichroic dye, to, for example, a PVA film made of a PVA resin and then stretching the PVA film. By this stretching treatment, the iodine molecules are oriented in a direction that corresponds to the stretching direction of the PVA film. Therefore, the polarization property can be added to the PVA film such that the stretching direction corresponds to the block axis SAp, and a direction, which is perpendicular to the stretching direction, corresponds to the transmission axis TAp. That is, the polarizing plate 42 of the present embodiment is an iodine-based polarizing plate, and the block axis SAp of the polarizing plate 42 is an absorption axis for absorbing the light oscillated in the block direction.

The protective layer 42b is formed, for example, by a TAC film made of a TAC (triacetyl cellulose) resin, a PET film made of a PET (polyethylene terephthalate) resin, or a stack of these films. Such a protective layer 42b may be accompanied by a hard coat, an antiglare coat, an antireflection coat, an antistatic coat, or a coat having a combination of these functions.

The polarizing plate 42, particularly the polarizing layer 42a of the polarizing plate 42 is in a state where a residual stress, a degree of which is maximized in the direction along the stretching direction, is left in the polarizing plate 42 (particularly the polarizing layer 42a of the polarizing plate 42) due to the stretching treatment. This direction, in which the maximum residual stress is exerted in the polarizing plate 42, will be defined as a first residual stress direction RSD1 in the present embodiment. The residual stress has uniformity in each portion of the polarizing plate 42.

The support plate 43 is shaped in a flat plate form and has translucency. The support plate 43 is mainly made of a synthetic resin having excellent processability, such as PMMA (polymethyl methacrylate) resin or PC (polycarbonate) resin. For example, the support plate 43 is formed by extruding a resin raw material from a mold in the extruding direction to form an extruded product having a plate-shaped cross section (extrusion molding), and then punching out individual pieces from the extruded product. Alternatively, for example, the support plate 43 is formed by rolling a resin raw material in a rolling direction with a roller to form a large flat plate (rolling process), and then punching out individual pieces from this flat plate.

Such a support plate 43 is in a state where a residual stress, a degree of which is maximized in the direction along the extruding direction or the rolling direction, is left in the support plate 43 due to the extrusion molding treatment or the rolling treatment. The direction, which is along a plane of the support plate 43 and in which the maximum residual stress is left in the support plate 43, will be defined as a second residual stress direction RSD2 in the present embodiment. The residual stress has uniformity in each portion of the support plate 43.

Due to the extrusion molding treatment or the rolling treatment, the support plate 43 substantially functions as a retardation plate. A fast axis of the support plate 43 is substantially one of the second residual stress direction RSD2 and the perpendicular direction, which is perpendicular to the second residual stress direction RSD2, among the directions along the plane of the support plate 43, and a slow axis of the support plate 43 is substantially the other one of the second residual stress direction RSD2 and the perpendicular direction, which is perpendicular to the second residual stress direction RSD2.

Then, the polarizing plate 42 and the support plate 43 are bonded together such that the first residual stress direction RSD1 is along the second residual stress direction RSD2, i.e., the first residual stress direction RSD1 and the second residual stress direction RSD2 coincide with each other. By doing so, even if the temperature of the polarization adjustment member 41 changes from a low temperature to a high temperature due to the incident of the external light, the effect of relieving the residual stress on the polarizing plate 42 and the effect of relieving the residual stress on the support plate 43 can be generated in the same direction as each other. That is, a pattern of deforming the polarization adjustment member 41 in response to the relieving of the residual stress is controlled to be a pattern that corresponds to the first residual stress direction RSD1 and the second residual stress direction RSD2 which coincide with each other.

Furthermore, since the fast axis and the slow axis of the support plate 43 coincide with the transmission axis TAp and the block axis SAp of the polarizing plate 42, respectively, polarization rotation on the support plate 43 is unlikely to occur. That is, an influence of a retardation value of the support plate 43 on the polarization adjusting function is limited. It is possible to simplify the manufacturing operation for reducing the manufacturing error of the retardation value of the support plate 43.

Furthermore, in the present embodiment, the first residual stress direction RSD1 and the second residual stress direction RSD2 of the polarization adjustment member 41 are aligned in the direction parallel to the tilt reference axis TRA of the liquid crystal panel 32. In this way, the tilted posture of the liquid crystal panel 32 and the direction of the pattern, in which the polarization adjustment member 41 is about to be deformed, are harmonized.

Further, the support plate 43 preferably satisfies the following performances. Specifically, the support plate 43 preferably has a transmittance of 85% or more. It is possible to limit attenuation of the display light when the display light passes through the polarization adjustment member 41. A thickness of the support plate 43 is preferably 10 times or more a thickness of the polarizing plate 42. When the residual stress of the thin plate-shaped polarizing plate 42 is relieved, it is possible to limit the support plate 43 from being integrally warped together with the polarizing plate 42 in response to an exertion of a contraction force of the polarizing plate 42. A glass transition temperature of the support plate 43 is preferably 105 degrees Celsius or higher. Since a temperature increase inside the HUD 10 installed at the automobile 1 is theoretically about 105 degrees Celsius at the maximum, the strength of the support plate 43 can be maintained to the extent that the support plate 43 does not warp. A coefficient of linear expansion of the support plate 43 is preferably 5.0 to $7.0 \times 10^{-5}$/K. By bringing the linear expansion coefficient of the polarizing plate 42 and the linear expansion coefficient of the support plate 43 close to each other, it is possible to limit an occurrence of warpage of the polarization adjustment member 41.

The case 51 holds both the projector 31 and the polarization adjustment member 41 such that a relative positional relationship between the projector 31 and the polarization adjustment member 41 can be maintained. The case 51 includes a backlight receiver 52, a cover 59 and a plurality of cushion materials 67, 68.

The backlight receiver 52 is shaped in a substantially rectangular tubular form and is made of a synthetic resin having a light-shielding property. The backlight receiver 52 receives the backlight 36 at an inside of a tubular hole 56 of the backlight receiver 52. An end portion of a tubular main body 53 of the backlight receiver 52, which is opposite to the cover 59, is an opening 53a having an opening plane formed substantially parallel to the light source circuit board 37a (and the light source arrangement surface 37b). The opening 53a is closed by a heat sink 69 that is made of metal having a thermal conductivity which is higher than that of the backlight receiver 52. By placing a back surface of the light source circuit board 37a in close contact with the heat sink 69, the heat, which is generated by the light source circuit board 37a, can be released to the outside of the case 51 that is spaced away from the liquid crystal panel 32 and the polarization adjustment member 41.

The backlight receiver 52 has a plurality of flanges 54, each of which is shaped in a plate form and laterally projects from the tubular main body 53. Each of the flanges 54 has a plurality of screw holes for fastening the backlight receiver 52 to the housing 11. Each of the flanges 54 is provided with a plurality of reinforcing ribs 55 for increasing a strength of the flange 54 such that the reinforcing ribs 55 connect between the tubular main body 53 and the flange 54.

An end portion of the tubular main body 53, which is located on the cover 59 side, is an opening 53b while an opening plane of the opening 53b is tilted relative to the light source arrangement surface 37b in conformity with the tilt angle α of the liquid crystal panel 32 and is substantially parallel to the liquid crystal panel 32. The tubular hole 56 of the tubular main body 53 may be closed by a diffusion plate 39 that is placed adjacent to the opening 53b.

Figure 5:
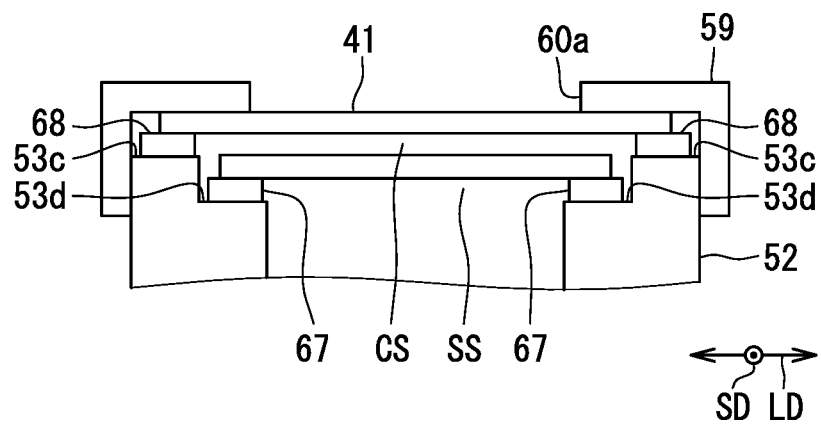
FIG. 5 is a diagram for describing clamping of the polarization adjustment member and a liquid crystal panel of the first embodiment.

As shown in FIG. 5, the opening 53b is stepped to have an increasing size that is increased in a stepwise manner toward the polarization adjustment member 41 from a size, which corresponds to a size of the light collecting unit 38 at the tubular hole 56, to sizes, which respectively correspond to a size of the liquid crystal panel 32 and a size of the polarization adjustment member 41. As a result, the opening 53b has: a pair of outer peripheral side pedestal surfaces 53c, which are located on an outer peripheral side and the polarization adjustment member 41 side; and a pair of inner peripheral side pedestal surfaces 53d, which are located on an inner peripheral side and the light source arrangement surface 37b side. The pair of outer peripheral side pedestal surfaces 53c are respectively located on two sides of the liquid crystal panel 32, which are opposite to each other in the longitudinal direction LD, and the pair of inner peripheral side pedestal surfaces 53d are also respectively located on the two sides of the liquid crystal panel 32, which are opposite to each other in the longitudinal direction LD. Each of the outer peripheral side pedestal surfaces 53c and the inner peripheral side pedestal surfaces 53d is shaped in an elongated form that is elongated along the opening plane (i.e., elongated in the transverse direction SD). Each of the outer peripheral side pedestal surfaces 53c and the inner peripheral side pedestal surfaces 53d is in a form of a flat surface.

The liquid crystal panel 32 is placed in a stepped space SS, which is formed between the outer peripheral side pedestal surfaces 53c and also between the inner peripheral side pedestal surfaces 53d, and the liquid crystal panel 32 is clamped between the inner peripheral side pedestal surfaces 53d and the cover 59. The polarization adjustment member 41 is placed in a cover space CS, which is formed between the outer peripheral side pedestal surfaces 53c and the cover 59, and the polarization adjustment member 41 is clamped between the outer peripheral side pedestal surfaces 53c and the cover 59.

Furthermore, as shown in FIG. 3, the backlight receiver 52 has a pair of engaging hole portions 57. The engaging hole portions 57 are transversely bulged from the opening 53b and hold the liquid crystal panel 32 from two opposite sides of the liquid crystal panel 32 which are opposite to each other in the transverse direction SD. Each of the engaging hole portions 57 has two engaging holes 57a which are spaced from each other by a predetermined interval in the longitudinal direction LD of the liquid crystal panel 32. Each of the engaging holes 57a is configured to be engaged with the cover 59.

The cover 59 is made of, for example, a synthetic resin having a light-shielding property. The cover 59 covers the liquid crystal panel 32, which is placed on the inner peripheral side pedestal surfaces 53d, and the polarization adjustment member 41, which is placed on the outer peripheral side pedestal surface 53c, while the cover 59 is configured to output the display light to the outside of the projector unit 30.

A cover main body 60 of the cover 59 is shaped in a rectangular frame plate form that surrounds the rectangular opening window 60a that matches the size of the display screen 32b. The cover main body 60 is tilted relative to the light source arrangement surface 37b in conformity with the tilt angle α of the liquid crystal panel 32 and the polarization adjustment member 41. In other words, the cover main body 60 is arranged substantially parallel to the inner peripheral side pedestal surfaces 53d, the liquid crystal panel 32, the outer peripheral side pedestal surfaces 53c and the polarization adjustment member 41. The cover main body 60 has: an exposed portion 61, which is exposed to the outside of the projector unit 30; and an opposing portion 62, which is located on a side opposite to the exposed portion 61 and is opposed to the polarization adjustment member 41 and the liquid crystal panel 32.

The cover 59 has a pair of engaging claw portions 65 which are laterally bulged from the cover main body 60 and are opposed to each other in the transverse direction SD to clamp the liquid crystal panel 32 therebetween in the transverse direction SD. Each of the engaging claw portions 65 has two engaging claws 65a which are spaced from each other by a predetermined interval in the longitudinal direction LD of the liquid crystal panel 32. Each of the engaging claws 65a projects toward the backlight receiver 52 in a normal direction, which is normal to the light source arrangement surface 37b, and each of the engaging claws 65a is engaged with a corresponding one of the engaging holes 57a by snap-fit. The backlight receiver 52 and the cover 59 are coupled with each other such that a cover space CS of a predetermined size is formed between the backlight receiver 52 and the cover 59.

Figure 6:
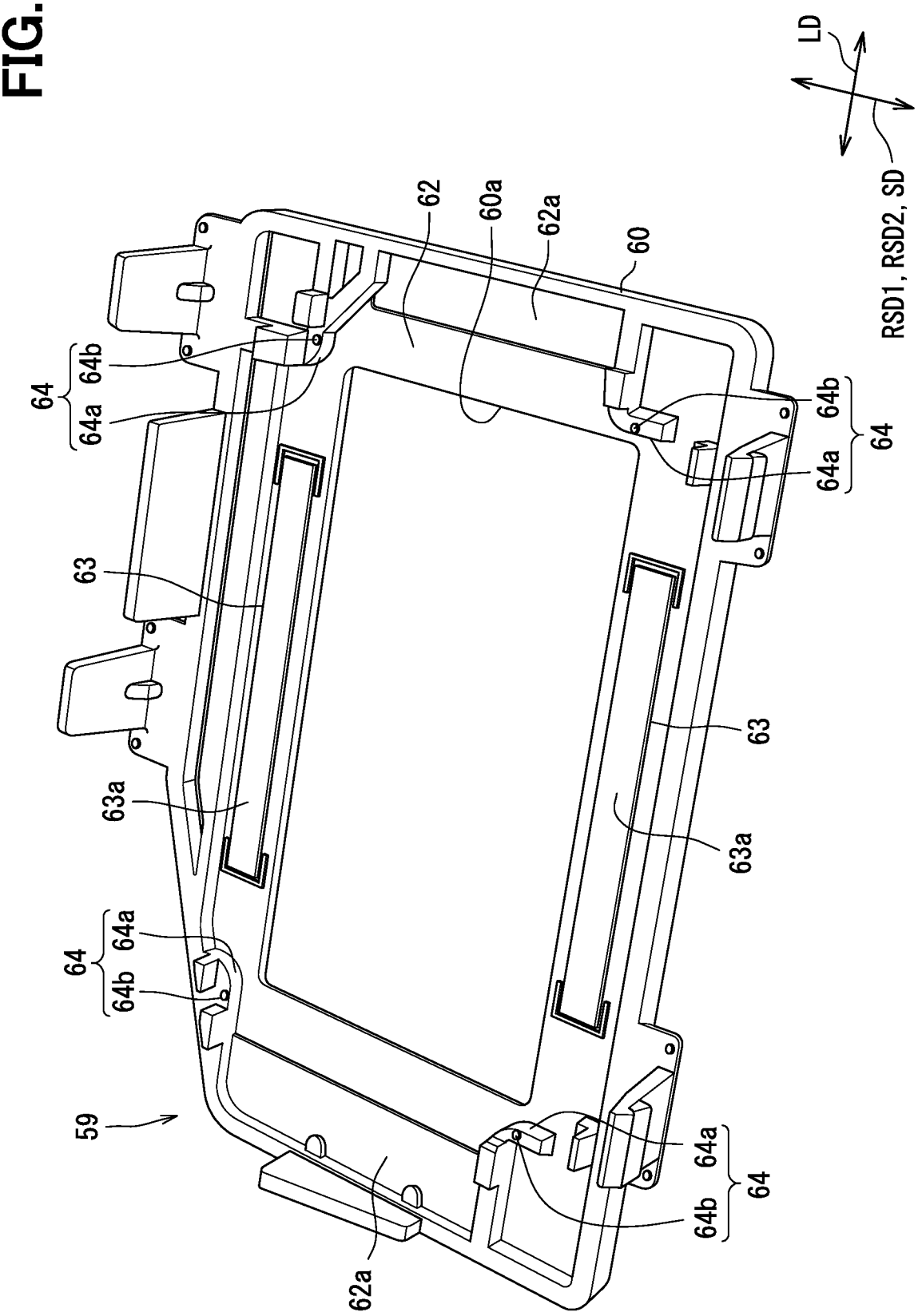
FIG. 6 is a rear perspective view of a cover of the first embodiment.
Figure 7:
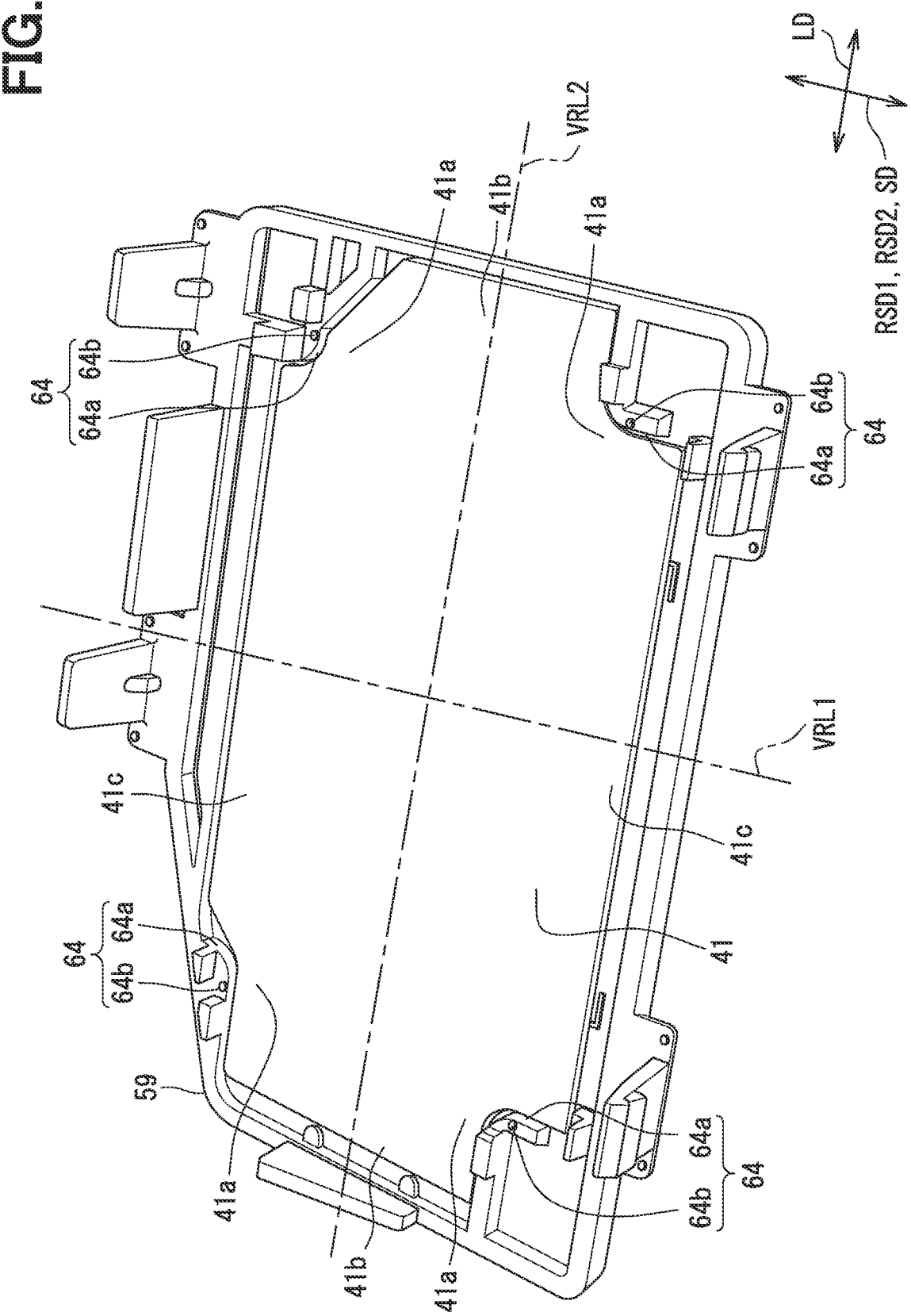
FIG. 7 is a diagram showing a state in which the polarization adjustment member is arranged in FIG. 6.
Figure 8:
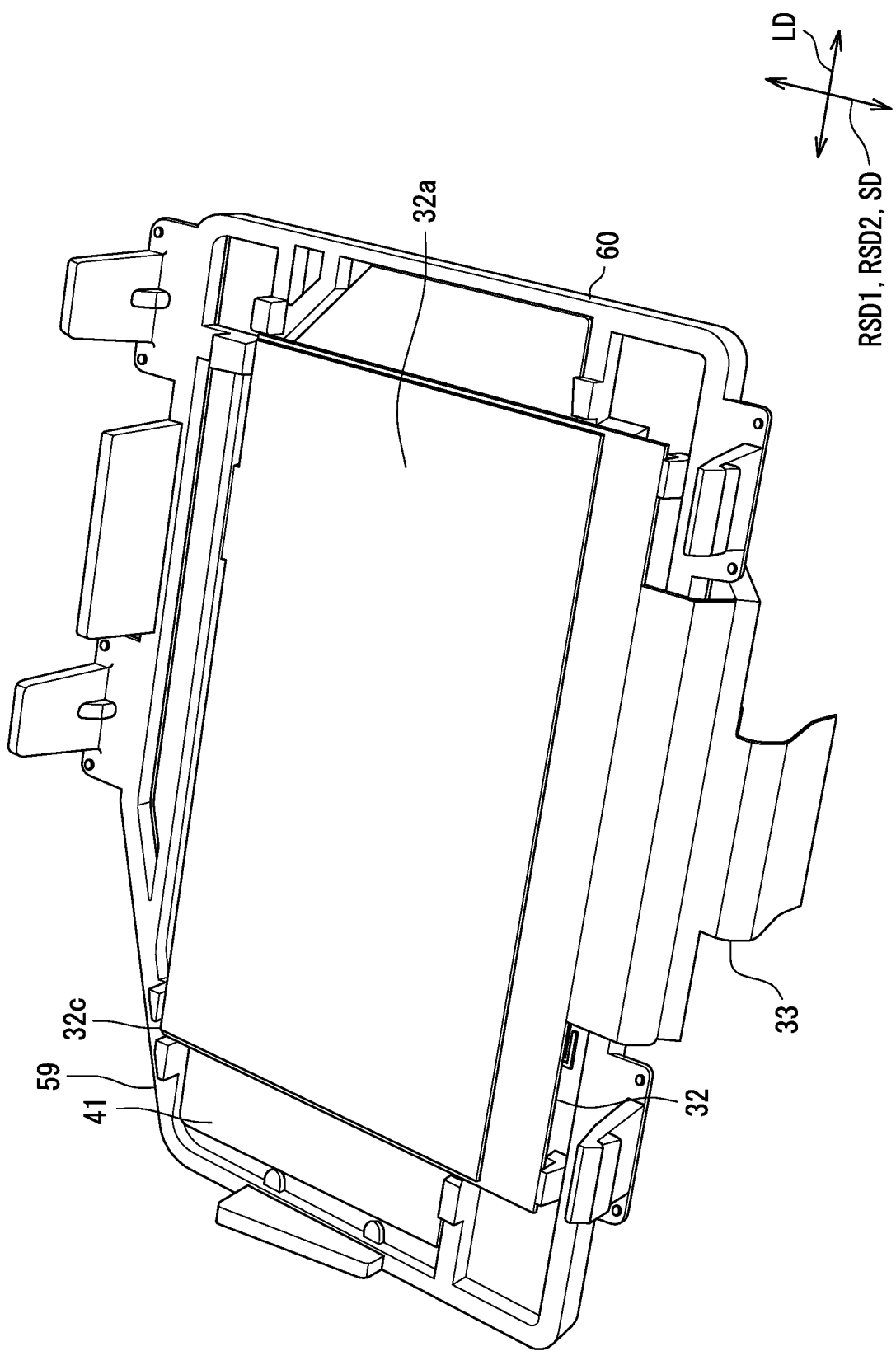
FIG. 8 is a diagram showing a state in which a liquid crystal panel is arranged in FIG. 7.

Hereinafter, the clamping of the polarization adjustment member 41 and the liquid crystal panel 32 will be described in detail with reference to FIGS. 6 to 8. Among the four bulges 41b, 41c of the polarization adjustment member 41, the pair of bulges 41b, between which the center of the polarization adjustment member 41 is interposed in the longitudinal direction LD, contact the outer peripheral side pedestal surfaces 53c through the cushion materials 68, respectively, on the backlight receiver 52 side. Each of the cushion materials 68 is realized by, for example, an elastically deformable elastomer, an urethane sponge or the like and is configured to absorb vibrations and an assembly error of the automobile 1.

The bulges 41*b* of the polarization adjustment member 41 contact a pair of contact surfaces 62*a* which are respectively shaped in a flat surface form while the pair of contact surfaces 62*a* are formed at the opposing portion 62 such that the opening window 60*a* is interposed between the contact surfaces 62*a* in the longitudinal direction LD. Among the four bulges 41*b*, 41*c* of the polarization adjustment member 41, the pair of bulges 41*c*, between which the center of the polarization adjustment member 41 is interposed in the transverse direction SD, contact a pair of elongated hold structures 63 of the opposing portion 62 on the cover 59 side.

Each of the elongated hold structures 63 has a contact portion 63*a*. The contact portion 63*a* is in contact with the polarization adjustment member 41 and is elongated in the longitudinal direction LD of the liquid crystal panel 32, i.e., a direction which is substantially perpendicular to the first residual stress direction RSD1 and the second residual stress direction RSD2. Each of the elongated hold structures 63 of the first embodiment is realized by an elongated double-sided adhesive tape fixed to the cover 59. Furthermore, the contact portion 63*a* of each of the elongated hold structures 63 is adhered to a corresponding one of the bulges 41*c* of the polarization adjustment member 41.

In the liquid crystal panel 32, the rectangular frame 32*c* contacts each of the inner peripheral side pedestal surfaces 53*d* through a corresponding one of the cushion materials 67 on the backlight receiver 52 side. In the liquid crystal panel 32, four corner portions of the rectangular frame 32*c* contact four projecting hold structures 64, respectively, of the opposing portion 62 on the cover 59 side.

Each of the projecting hold structures 64 is made of the synthetic resin that is integrated with the cover 59 in one-piece. Each of the projecting hold structures 64 is formed at a location which corresponds to the corresponding one of the four recesses 41*a* of the polarization adjustment member 41 and is deviated from the corresponding recess 41*a* toward the outer peripheral side of the cover 59. Furthermore, each of the projecting hold structures 64 projects to a position, which is closer to the corresponding one of the inner peripheral side pedestal surfaces 53*d* than the corresponding one of the contact surfaces 62*a* of the opposing portion 62, to hold the liquid crystal panel 32. Also, each of the projecting hold structures 64 includes a guide portion 64*a* and a hemispherical protrusion 64*b*. The guide portion 64*a* projects to a position closer to the backlight receiver 52 than the contact surfaces 62*a* and the elongated hold structures 63, such that the guide portion 64*a* extends along an outer peripheral contour of the corresponding recess 41*a* to guide (position) the outer peripheral contour of the polarization adjustment member 41. The hemispherical protrusion 64*b* is shaped in a hemispherical form that further protrudes from the guide portion 64*a* toward the corresponding inner peripheral side pedestal surface 53*d*, and the hemispherical protrusion 64*b* is in point contact with the corresponding corner portion of the rectangular frame 32*c* of the liquid crystal panel 32.

Effects and Advantages

Hereinafter, effects and advantages of the first embodiment will be described.

According to the first embodiment, at the polarizing plate 42 and the support plate 43, which are bonded together, the first residual stress direction RSD1 of the polarizing plate 42 is along the second residual stress direction RSD2 of the support plate 43. That is, the direction, in which the degree of the residual stress left in the polarizing plate 42 is maximized, and the direction, in which the degree of the residual stress left in the support plate 43 is maximized, coincide with each other. Thus, even if the residual stress of the polarizing plate 42 and the residual stress of the support plate 43 are relieved in response to a temperature change of the polarization adjustment member 41 due to, for example, the incident of the external light on the polarization adjustment member 41, it is possible to limit an occurrence of deformation of the polarizing plate 42 and deformation of the support plate 43 in different directions, respectively. In other words, an occurrence of the unintentional deformation, such as unintentional warpage, of the polarization adjustment member 41 is limited.

For example, since the complicated deformation of the polarization adjustment member 41 is limited, an occurrence of local unevenness of the optical action of the polarization adjustment member 41 and also an occurrence of local unevenness (for example, luminance unevenness) in the display quality of the virtual image VRI can be limited. Furthermore, for example, the undeformed state of the polarization adjustment member 41 can be easily maintained if the minimum deformation countermeasure corresponding to the directions RSD1, RSD2, which coincide with each other, is taken. As described above, it is possible to stably exert the optical action in the display of the virtual image VRI.

Further, according to the first embodiment, the polarization adjustment member 41 is held in the common case 51, which commonly holds the polarization adjustment member 41 and the projector 31, so that the projector unit 30, in which the polarization adjustment member 41 and the projector 31 are integrated together, is formed. By doing so, the relative positional relationship between the projector 31 and the polarization adjustment member 41 can be easily maintained. Therefore, it is possible to limit an occurrence of an abnormality in the optical action, such as the polarization adjustment.

Furthermore, according to the first embodiment, the polarization adjustment member 41 is held through the elongated hold structures 63 that respectively has the contact portion 63*a* while the contact portion 63*a* is in contact with the polarization adjustment member 41 and is elongated in the direction which is parallel to or perpendicular to the first residual stress direction RSD1 and the second residual stress direction RSD2. With respect to the polarization adjustment member 41, in which the unintended deformation, such as the unintended warpage, in a direction oblique to the first residual stress direction RSD1 and the second residual stress direction RSD2 is limited, the deformation, such as the warpage, of the polarization adjustment member 41 in a non-oblique direction, which is not oblique to the first residual stress direction RSD1 and the second residual stress direction RSD2, is also limited by the above-described elongating mode of the respective contact portions 63*a*. Since the maintenance performance for maintaining the undeformed state of the polarization adjustment member 41 is efficiently maintained, the stability of the optical action at the time of displaying the virtual image VRI is remarkably improved.

Furthermore, according to the first embodiment, the polarization adjustment member 41 is arranged such that the first residual stress direction RSD1 and the second residual stress direction RSD2 are set to be along the parallel direction, which is parallel to the tilt reference axis TRA, or the perpendicular direction, which is perpendicular to the tilt reference axis TRA. Therefore, it is possible to limit complex and anisotropic action of the influence of the tilt of the liquid crystal panel 32 and the influence of the deformation of the polarization adjustment member 41, which is controlled in the mode corresponding to the first residual stress direction RSD1 and the second residual stress direction RSD2. That is, it is possible to limit the occurrence of local unevenness in the display quality of the virtual image VRI.

If an optical material, such as glass, which is not excellent in processability, is used for the support plate 43, the shape of the outer peripheral contour of the support plate 43 must be simplified in order to reduce the cost. On the other hand, according to the first embodiment, since the synthetic resin, which has the excellent processability, is used for the support plate 43, the shape of the outer peripheral contour of the polarization adjustment member 41 can be made more complex. The shape of the outer peripheral contour of the polarization adjustment member 41 is asymmetric about at least one of: the imaginary reference line VRL1 which bisects the surface area of the polarization adjustment member 41 in the perpendicular direction that is perpendicular to the first residual stress direction RSD1 and the second residual stress direction RSD2; and the other imaginary reference line VRL2 which bisects the surface area of the polarization adjustment member in the parallel direction that is parallel to the first residual stress direction RSD1 and the second residual stress direction RSD2. Due to such a shape that is line asymmetric, i.e., is not line symmetric, for example, it is possible to limit an occurrence of misorientation of the polarization adjustment member 41 at the time of placing the polarization adjustment member 41 on the optical path during the manufacturing. Therefore, since the first residual stress direction RSD1 can be correctly arranged relative to the hold structures, unintended deformation, such as unintended warpage, is limited. At the same time, since the optical axis, such as the block axis SAp, which is associated with the first residual stress direction RSD1, is correctly arranged, it is possible to provide the polarization adjustment member 41 that correctly exhibits the expected polarization adjusting function.

Other Embodiments

Although the one embodiment has been described above, the present disclosure should not be limited to this embodiment and may be applied to various other embodiments without departing from the gist of the present disclosure.

Specifically, as a first modification, the elongated hold structures 63 may be realized as urging ribs that are formed integrally with the cover 59 in one-piece. The urging ribs, which protrude from the opposing portion 62 toward the outer peripheral side pedestal surfaces 53c, may extend along the longitudinal direction LD or the transverse direction SD of the liquid crystal panel 32, so that distal end portions of the urging ribs, may serve as the contact portions 63a which extend in the direction that is substantially parallel to the first residual stress direction RSD1 and the second residual stress direction RSD2 and contact the polarization adjustment member 41. Each of the urging ribs urges the corresponding one of the bulges 41c of the polarization adjustment member 41 through the contact portion 63a. In this way, the polarization adjustment member 41 is clamped between the backlight receiver 52 and the cover 59 in the state where the cushion materials 68 are interposed between the polarization adjustment member 41 and the backlight receiver 52.

As a second modification, the contact portions 63a of the elongated hold structures 63 may be elongated along a direction substantially parallel to the first residual stress direction RSD1 and the second residual stress direction RSD2.

As a third modification, the polarization adjustment member 41 may be held by using a hold structure(s) other than the elongated hold structures 63.

As a fourth modification, the polarization adjustment member 41 does not have to be held by the common case 51, which is common to the polarization adjustment member 41 and the projector 31, as long as the polarization adjustment member 41 is placed along the optical path which extends from the projector 31 to the windshield 3. The polarization adjustment member 41 may be arranged at a position, which is spaced away from the projector 31, for example, such that the polarization adjustment member 41 is installed to the window portion 12 of the housing 11 and also functions as the dustproof sheet. The polarization adjustment member 41 does not have to be arranged in parallel with the liquid crystal panel 32.

As a fifth modification, the polarization adjustment member 41 may be any type of polarization adjustment member as long as it adjusts the polarization of at least one of the display light and the external light. For example, the polarization adjustment member 41 may change the polarization direction of the display light outputted from the liquid crystal panel 32 such that the occupant wearing polarized sunglasses can easily see the virtual image VRI.

As a sixth modification, the polarizing plate 42 does not have to be the iodine-based polarizing plate. For example, since there is a type of reflective polarizing plate in which a residual stress is left along a plane of the reflective polarizing plate, such a reflective polarizing plate may be used. In a case where the first residual stress direction RSD1 of the reflective polarizing plate is along the transmission axis TAp, the first residual stress direction RSD1 and the second residual stress direction RSD2 may be along the direction that is parallel to the tilt reference axis TRA.

As a seventh modification, the transmission axis TAd of the liquid crystal panel 32 may be set in an oblique direction that defines an angle of, for example, 45 degrees relative to the longitudinal direction LD. Further, the projector 31 may project an unpolarized display light.

It should be noted that in the present disclosure, the perpendicular direction, which is perpendicular to the predetermined direction, or the perpendicular direction, which is perpendicular to the predetermined axis may not actually intersect the predetermined direction or the predetermined axis, as in the concept of "perpendicular" of the translation invariant vector.

What is claimed is:
1. A virtual image display device configured to display a virtual image that is formed by a display light through reflection of the display light at a translucent member and is visually recognizable, the virtual image display device comprising:
  a projector that is configured to project the display light; and
  a polarization adjustment member that is located along an optical path, which extends from the projector to the translucent member, while the polarization adjustment member is configured to adjust polarization of at least one of the display light and an external light which travel along the optical path, wherein:

the polarization adjustment member includes:

a polarizing plate that is shaped in a thin plate form and has a property of blocking a light which is oscillated in an axial direction of a block axis of the polarizing plate, wherein the polarizing plate is in a state where a residual stress, a degree of which is maximized in a first residual stress direction along a plane of the polarizing plate, is left in the polarizing plate; and a support plate that is shaped in a plate form and supports the polarizing plate, wherein the support plate is in a state where a residual stress, a degree of which is maximized in a second residual stress direction along a plane of the support plate, is left in the support plate; and the polarizing plate and the support plate are bonded together such that the first residual stress direction is along the second residual stress direction.

2. The virtual image display device according to claim 1, wherein the polarization adjustment member is held by a common case, which also holds the projector, so that the polarization adjustment member and the projector are integrated together to form a projector unit.

3. The virtual image display device according to claim 1, wherein the polarization adjustment member is held through an elongated hold structure that has a contact portion while the contact portion is in contact with the polarization adjustment member and is elongated in a direction which is parallel to or perpendicular to the first residual stress direction and the second residual stress direction.

4. The virtual image display device according to claim 1, wherein:

the projector includes:

a backlight that is arranged such that an intensity peak direction, in which a degree of an emission intensity of an illuminating light outputted from the backlight is maximized, is along a normal direction that is normal to a light source arrangement surface of the backlight; and an image display panel that is placed in a tilted posture where the image display panel is rotated from a parallel posture of the image display panel, which is parallel to the light source arrangement surface, by a predetermined tilt angle about a tilt reference axis; and the polarization adjustment member is arranged such that the first residual stress direction and the second residual stress direction are along a parallel direction, which is parallel to the tilt reference axis, or a perpendicular direction, which is perpendicular to the tilt reference axis.

5. A polarization adjustment member configured to be placed along an optical path of an imaging optical system used for displaying a virtual image, the polarization adjustment member comprising:

a polarizing plate that is shaped in a thin plate form and has a property of blocking a light which is oscillated in an axial direction of a block axis of the polarizing plate, wherein the polarizing plate is in a state where a residual stress, a degree of which is maximized in a first residual stress direction along a plane of the polarizing plate, is left in the polarizing plate; and a support plate that is shaped in a plate form and supports the polarizing plate, wherein the support plate is in a state where a residual stress, a degree of which is maximized in a second residual stress direction along a plane of the support plate, is left in the support plate wherein:

the polarizing plate and the support plate are bonded together such that the first residual stress direction is along the second residual stress direction.

6. The polarization adjustment member according to claim 5, wherein:

the support plate is made of a synthetic resin; and a shape of an outer peripheral contour of the polarization adjustment member is asymmetric about at least one of:

one imaginary reference line which bisects a surface area of the polarization adjustment member in a perpendicular direction that is perpendicular to the first residual stress direction and the second residual stress direction; and another imaginary reference line which bisects the surface area of the polarization adjustment member in a parallel direction that is parallel to the first residual stress direction and the second residual stress direction.

* * * * *